United States Patent
Lu et al.

(10) Patent No.: US 12,351,982 B2
(45) Date of Patent: Jul. 8, 2025

(54) METHOD FOR RECYCLING WASTE ARAMID-MICA COMPOSITE PAPER

(71) Applicant: Shaanxi University of Science & Technology, Xi'an (CN)

(72) Inventors: Zhaoqing Lu, Xi'an (CN); Fengfeng Jia, Xi'an (CN); Li Hua, Xi'an (CN); Songfeng E, Xi'an (CN); Yuanqing Liu, Xi'an (CN); Jiayue Dong, Xi'an (CN); Nan Li, Xi'an (CN); Bo Geng, Xi'an (CN)

(73) Assignee: Shaanxi University of Science & Technology, xi'an (CN)

( * ) Notice: Subject to any disclaimer, the term of this patent is extended or adjusted under 35 U.S.C. 154(b) by 563 days.

(21) Appl. No.: 17/858,952

(22) Filed: Jul. 6, 2022

(65) Prior Publication Data

US 2022/0340730 A1   Oct. 27, 2022

(51) Int. Cl.
*D21C 5/02* (2006.01)
*B09B 3/80* (2022.01)
*C01B 33/20* (2006.01)
*C08J 11/08* (2006.01)
*D21C 3/20* (2006.01)
*D21C 11/10* (2006.01)

(52) U.S. Cl.
CPC .................. *D21C 5/02* (2013.01); *B09B 3/80* (2022.01); *C01B 33/20* (2013.01); *C08J 11/08* (2013.01); *D21C 3/20* (2013.01); *D21C 5/022* (2013.01); *D21C 11/10* (2013.01); *C08J 2377/00* (2013.01)

(58) Field of Classification Search
CPC . D21C 5/02; D21C 5/022; D21C 3/20; D21C 11/10; D21B 1/32; D21B 1/08; D21H 13/44; D21H 5/186
See application file for complete search history.

(56) References Cited

U.S. PATENT DOCUMENTS 11,885,071 B2 *   1/2024   Lu ........................... D21H 17/68

FOREIGN PATENT DOCUMENTS

| CN | 102002883 A | * | 4/2011 | ............. D21H 13/02 |
| CN | 108316038 A | * | 7/2018 | ............... D21B 1/32 |
| CN | 111549566 A |   | 8/2020 | |
| CN | 111732746 A | * | 10/2020 | ............. B32B 27/12 |
| EP | 0027516 A1 | * | 10/1980 | ............. C08L 67/02 |

OTHER PUBLICATIONS

English Machine translation CN102002883AI, 2011. (Year: 2011).*
English Machine translation CN108316038AI, 2018. (Year: 2018).*
English Machine translation CN111732746AI, 2020. (Year: 2020).*
CN101748647A1, abstract only, 2010. (Year: 2010).*

* cited by examiner

*Primary Examiner* — Anthony Calandra

(57) ABSTRACT

The disclosure relates to resource recycling, and more particularly to a green and efficient method for recycling waste aramid-mica composite paper. The method includes: dissolution of aramid-mica composite paper scraps, separation of mica flakes; phase separation, filtration, recycling of organic solvent and collection of aramid fiber.

10 Claims, 1 Drawing Sheet

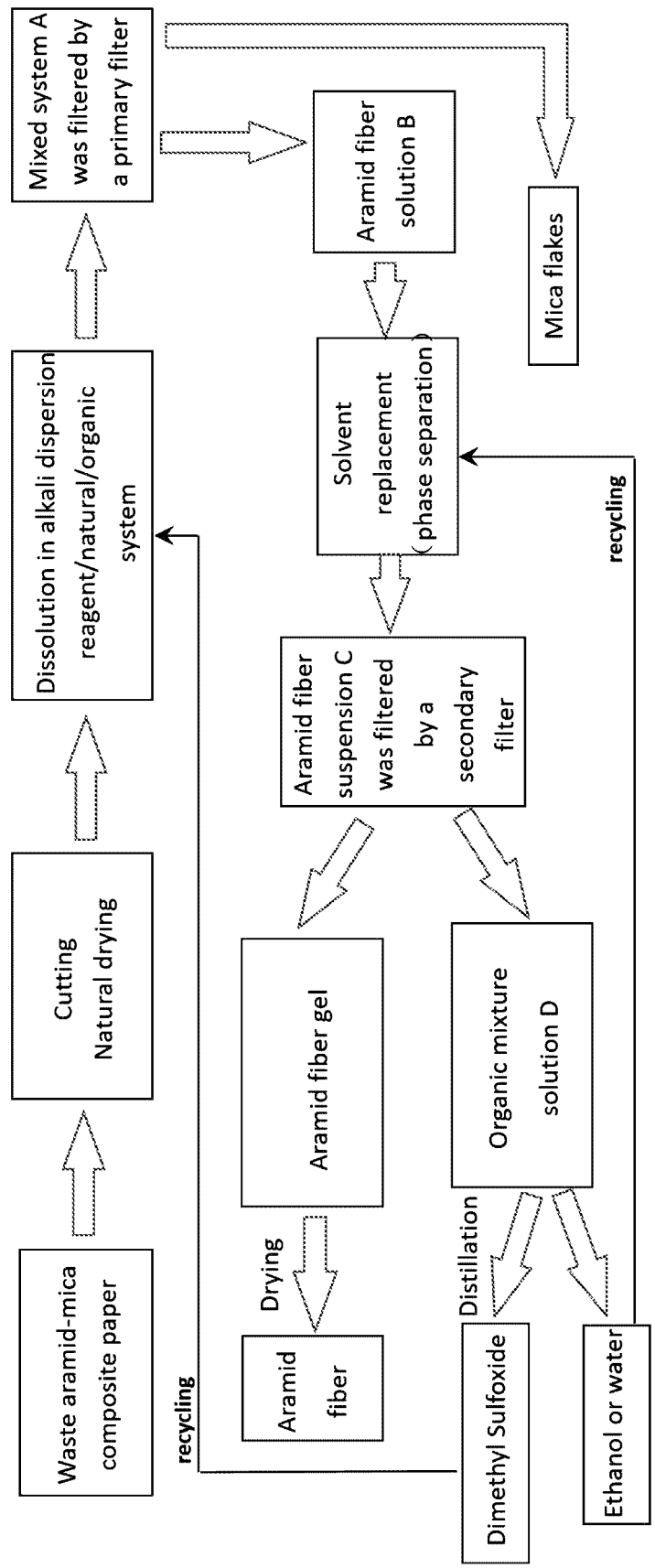

METHOD FOR RECYCLING WASTE ARAMID-MICA COMPOSITE PAPER

CROSS-REFERENCE TO RELATED APPLICATIONS

This application claims the benefit of priority from Chinese Patent Application No. 202210380625.X, filed Apr. 12, 2022. The content of the aforementioned application, including any intervening amendments thereto, is incorporated herein by reference.

TECHNICAL FIELD

The disclosure belongs to resource recycling, and more particularly relates to a method for recycling waste aramid-mica composite paper.

BACKGROUND

With the emergence of 330 kV power transmission, a new era of high voltage power transmission has been opened. At the meantime, the high voltage power transmission also brings a severe shortage of insulation materials for transformers, bushing, motors, generators and other fields. At the end of the last century, the international transmission voltage has reached 1000 kV, and the frequency tolerance of frequency conversion equipment to insulation materials has also increased to the kHz level. At the same time, with regard to the rail transportation, wind power, and aerospace equipment, the electrical insulation is applied to the extreme extent, even beyond the upper limit of some polymer insulation materials. Aramid-mica composite paper with an aramid fiber as a polymer matrix and the mica as an inorganic high insulation component are used for inverter motors, oil-immersed transformers, dry-type transformers, and other equipment. According to industry reports, companies producing the aramid-mica composite paper, mainly includes Yantai Metastar Special Paper Co., LTD., and DuPont Company. Nowadays, the production capacity of the aramid-mica composite paper has reached 3000 tons/year in China, and 10000 tons/year in the whole world. The aramid-mica composite paper is a kind of high-temperature-resistant insulation material, which conforms to the development of eras. The aramid-mica composite paper not only has excellent mechanical properties and thermal stability, but also has the advantages of corona resistance and aging resistance.

However, with the increase in production capacity and consumption market of domestic aramid-mica composite paper, hundreds of thousands to millions of tons of waste aramid-mica composite paper will be accumulated in the future. During the application process, the aramid fiber possessed excellent properties such as anti-aging, long life, temperature resistance, and chemical corrosion resistance, which makes it difficult to be decomposed in high-temperature and low-temperature environments. The shortest degradation cycle of the aramid fiber is more than 100 years, which brings great challenges to the recycling of the aramid-mica composite paper. At the same time, the mica flake of the aramid-mica composite paper is a high-crystalline mineral component, which is difficult to be separated and recycled by using ordinary mechanical equipment. Moreover, the existing recycling technology for waste paper materials is mainly aimed at plant fiber paper materials, which is difficult to meet the market demand for recycling high-performance fiber paper materials such as aramid-mica composite paper. Therefore, the object of the disclosure is to provide a new method for recycling the waste aramid-mica composite paper.

SUMMARY

An object of the disclosure is to provide a green and efficient method for recycling waste aramid-mica composite paper to overcome the defects existing in the prior art.

This application provides a method for recycling waste aramid-mica composite paper, comprising:
- (S1) pre-processing the waste aramid-mica composite paper to obtain a dehydrated aramid-mica composite paper scrap;
- (S2) dissolving the dehydrated aramid-mica composite paper in a mixture solution to obtain a mixture system A, wherein the mixture solution comprises a dispersing agent, an alkali, and an organic solvent;
- (S3) filtering the mixture system A with a primary filter to obtain a mica flake and an aramid fiber solution;
- (S4) adding a replacement solvent to the aramid fiber solution for solvent replacement and phase separation to obtain an aramid fiber suspension;
- (S5) filtering the aramid fiber suspension with a secondary filter to obtain an aramid fiber gel and a mixture system B composed of the organic solvent and the dispersing agent; and
- (S6) subjecting the mixture system B to distillation at a preset temperature to recycle the organic solvent; and drying the aramid fiber gel to collect aramid fiber.

In an embodiment, in step (S1), the waste aramid-mica composite paper is aramid-mica paper or a paper-based material with poly(m-phenylene isophthalamide) as polymer matrix.

In an embodiment, in step (S1), a size of the dehydrated aramid-mica composite paper scrap is 2-5 $cm^2$.

In an embodiment, in step (S2), the mixture solution is prepared through steps of:
dissolving the alkali in the dispersing agent to form a mixture followed by addition of the organic solvent and stirring to obtain the mixture solution;
wherein a ratio of the dispersing agent to the alkali to the organic solvent is 1 mL:(1-2) g:(300-600) mL.

In an embodiment, the dispersing agent is water, ethanol, methanol or a combination thereof; the alkali is solid potassium hydroxide, solid sodium hydroxide or a combination thereof; and the organic solvent is dimethyl sulfoxide solution, dimethyl formamide, or a combination thereof.

In an embodiment, the primary filter is a 100-200 mesh filter; and the secondary filter mesh is 400-1000 mesh filter.

In an embodiment, in step (S4), a volume ratio of the replacement solvent to the aramid fiber solution B is (2-3):1.

In an embodiment, the replacement solvent is water or ethanol.

In an embodiment, in step (S6), when the replacement solvent is water, the preset temperature is 100-105° C.; and when the replacement solvent is ethanol, the preset temperature is 75-78° C.

In an embodiment, in step (S6), the drying of the aramid fiber gel is performed at 60-100° C. for 4-24 h.

Compared with the prior art, the disclosure has the following beneficial effects.

A method for recycling waste aramid-mica composite paper provided herein involves the dissolution of the aramid-mica composite paper scraps, the separation of mica flakes, the phase separation of the aramid fiber, the filtration separation of the aramid fiber and the recycling of organic system, which is highly efficient, and has a high recovery rate and a thorough separation effect.

In view of the stable properties, high acid resistance and high alkali resistance of the aramid-mica composite paper, the method provided herein is different from the traditional recycling process used for recycling cellulose from the waste paper by water treatment and centrifugal separation of impurities. In the method provided herein, a unique chemical dissolution strategy is adopted, by using a mixture solution containing an alkali dispersion reagent, an alkali, and an organic system to dissolve the aramid fiber of the aramid-mica composite paper. Subsequently, the mica flake is separated thoroughly through physics filtration separation. The whole process is efficient and thorough, which has solved the problem of the separation of aramid fiber and mica flakes.

By adding a poor solvent (i.e., a replacement solvent) to a good solvent of the aramid fiber, the aramid fiber is separated by phase separation, precipitation, and physical filtration, which reduced the environmental pollution caused by the aramid fiber. The aramid fiber polymer gel separated by the secondary filtering can be recycled and reused after drying. Therefore, the whole process is a typical green chemical process.

Finally, the organic system is recycled by high-temperature distillation based on the different boiling points of the organic system and water, which avoids the secondary pollution to the environment caused by the waste. In addition, the recycling of the organic system reduces the cost of the whole process, which is convenient for green industrial production, and presents excellent social and economic benefits.

BRIEF DESCRIPTION OF THE DRAWINGS

This FIGURE is a flow chart of a method for recycling waste aramid-mica composite paper according to an embodiment of the present disclosure.

DESCRIPTION OF THE EMBODIMENTS

The present disclosure will be described in detail in combination with drawings and embodiments. The following description is merely for explanation rather than a limitation on the present disclosure.

Disclosed is a method for recycling waste aramid-mica composite paper (as shown in the FIGURE), which includes the following steps.
- (S1) Waste aramid-mica composite paper is pre-processed, where the waste aramid-mica composite paper is a paper-based material with poly(m-phenylene isophthalamide) and poly(p-phenylene terephthamide) as polymer matrix.

The dehydrated aramid-mica composite paper scrap with the size of 2-5 cm² is obtained by the pre-process involving manual selection, air drying and cutting, where the air drying is natural air drying, and lasts for 2-5 h.
- (S2) The dehydrated aramid mica paper scrap was dissolved in a mixture solution to obtain a mixture system A, where the mixture solution contains a dispersing agent, an alkali, and an organic solvent in a ratio of 1 mL:(1-2) g:(300-600) mL.

The mixture solution is prepared through the following steps.

The alkali is completely dissolved in the dispersing agent to form a mixture followed by addition of the organic solvent and stirring to obtain the mixture solution, where a ratio of the dispersing agent to the alkali to the organic solvent is 1 mL:(1-2) g:(300-600) mL.

The dispersing agent is water, ethanol, methanol, or a combination thereof. The alkali is solid potassium hydroxide, solid sodium hydroxide, or a combination thereof. The organic solvent is dimethyl sulfoxide, dimethyl formamide, or a combination thereof.
- (S3) The mixture system A is filtered with a primary filter to obtain a mica flake and an aramid fiber solution, where the primary filter is a 100-200 mesh filter.
- (S4) The replacement solvent (water or ethanol) is added to the aramid fiber solution for solvent replacement and phase separation to obtain an aramid fiber suspension, where the volume ratio of the replacement solvent to the aramid fiber solution is (2-3):1.

Mechanical stirring was performed at 400-1000 r/min for 20-30 min to accelerate the solvent replacement process.
- (S5) The aramid fiber suspension is filtered with a secondary filter to obtain an aramid fiber gel and a mixture system B composed of the organic solvent, and the dispersing agent, where the secondary filter is a 400-1000 mesh filter.
- (S6) The mixture system B is subjected to distillation at a preset temperature to recycle the organic solvent. When the replacement solvent is water, the preset temperature is 100-105° C. When the replacement solvent is ethanol, the preset temperature is 75-78° C.

The aramid fiber gel is dried at 60-100° C. for 4-24 h to collect aramid fiber.

Example 1

Provided was a method for recycling waste aramid-mica composite paper, which included the following steps.
- (S1) Waste aramid-mica composite paper was pre-processed by air drying for 2 h and cutting to obtain a dehydrated aramid-mica composite paper scrap with a size of about 2 cm².
- (S2) 1 g of potassium hydroxide was dissolved in 1 mL of water, and added with 300 ml of dimethyl sulfoxide solution followed by stirring for 30 min to obtain a water/potassium hydroxide/dimethyl sulfoxide mixture solution. Then, 5 g of the dehydrated aramid-mica composite paper scrap were added into the water/potassium hydroxide/dimethyl sulfoxide mixture solution to obtain a mixture system A.
- (S3) The mixture system A was filtered with a 100-mesh primary filter to obtain a mica flake and an aramid fiber solution.
- (S4) Water was added to aramid fiber solution for solvent replacement to obtain an aramid fiber suspension, where the volume ratio of the water to the aramid fiber solution was 2:1.

Mechanical stirring was performed at 400 r/min for 20 min to accelerate the solvent replacement process.
- (S5) The aramid fiber suspension was filtered with a 400-mesh secondary filter to obtain an aramid fiber gel and a dimethyl sulfoxide/water mixture solution.
- (S6) The dimethyl sulfoxide/water mixture solution was distilled at 100° C. to recycle the dimethyl sulfoxide. The aramid fiber gel was dried to recycle the aramid fiber.

In Example 1, more than 97 wt % of the aramid fiber, 99 wt % of the mica flake, and 90.5 wt % of the organic system were recycled.

Example 2

Provided was a method for recycling waste aramid-mica composite paper, which included the following steps.

(S1) Waste aramid-mica composite paper was pre-processed by air drying for 3 h, and cutting to obtain a dehydrated aramid-mica composite paper scrap with a size of about 3 cm$^2$.

(S2) 2 g of potassium hydroxide was dissolved in 1 mL of water, and added with 400 mL of dimethyl sulfoxide solution followed by stirring for 40 min to obtain a water/potassium hydroxide/dimethyl sulfoxide mixture solution. Then, 5 g of the dehydrated aramid-mica composite paper scrap were added into the water/potassium hydroxide/dimethyl sulfoxide mixture solution to obtain a mixture system A.

(S3) The mixture system A was filtered with a 200-mesh primary filter to obtain a mica flake and an aramid fiber solution.

(S4) Ethanol was added to the aramid fiber solution for solvent replacement to obtain an aramid fiber suspension, where the volume ratio of the ethanol to the aramid fiber solution was 3:1.

Mechanical stirring was performed at 600 r/min for 25 min to accelerate the solvent replacement process.

(S5) The aramid fiber suspension was filtered with a 700-mesh secondary filter to obtain an aramid fiber gel and a dimethyl sulfoxide/water mixture solution (S6) The dimethyl sulfoxide/water mixture solution was distilled at 78° C. to recycle the dimethylformamide.

In Example 2, more than 97% of the aramid fiber, 99% of the mica flake, and 91.7% of the organic system were recycled.

Example 3

Provided was a method for recycling waste aramid-mica composite paper, which included the following steps.

(S1) Waste aramid-mica composite paper was pre-processed by air drying for 5 h, and cutting to obtain a dehydrated aramid-mica composite paper scrap with a size of about 5 cm$^2$.

(S2) 2 g of potassium hydroxide was dissolved in 1 mL of water, and added with 400 mL of dimethyl sulfoxide solution followed by stirring for 60 min to obtain a water/potassium hydroxide/dimethyl sulfoxide mixture solution. Then, 5 g of the dehydrated aramid-mica composite paper scrap were added into the water/potassium hydroxide/dimethyl sulfoxide mixture solution to obtain a mixture system A.

(S3) The mixture system A was filtered with a 200-mesh primary filter to obtain a mica flake and an aramid fiber solution.

(S4) Water was added to aramid fiber solution for solvent replacement, to obtain an aramid fiber suspension, where the volume ratio of the water to the aramid fiber solution B was 3:1.

Mechanical stirring was performed at a stirring speed of 1000 r/min for 30 min to accelerate the solvent replacement process.

(S5) The aramid fiber suspension was filtered with a 1000-mesh secondary filter to obtain an aramid fiber gel and a dimethyl sulfoxide/water mixture solution.

(S6) The dimethyl sulfoxide/water mixture solution was distilled at 105° C. to recycle the dimethyl sulfoxide.

In Example 3, more than 97 wt % of the aramid fiber, 99 wt % of the mica flake and 92.3 wt % of the organic system were recycled.

Example 4

Provided was a method for recycling waste aramid-mica composite paper, which included the following steps.

(S1) Waste aramid-mica composite paper was pre-processed by air drying for 3 h, and cutting to obtain a dehydrated aramid-mica composite paper scrap with a size of about 2 cm$^2$.

(S2) 1 g of potassium hydroxide was dissolved in 1 mL of water, and then added with 300 ml of dimethyl sulfoxide solution followed by stirring for 30 min to obtain a water/potassium hydroxide/dimethyl sulfoxide mixture solution. Then, 10 g of the dehydrated aramid-mica composite paper scrap was added to the water/potassium hydroxide/dimethyl sulfoxide mixture solution to obtain a mixture system A.

(S3) The mixture system A was filtered with a 100-mesh primary filter to obtain a mica flake and an aramid fiber solution.

(S4) Water was added to the aramid fiber solution for solvent replacement to obtain aramid fiber suspension, where the volume ratio of the water to the aramid fiber solution was 2:1.

Mechanical stirring was performed at 400 r/min for 20 min to accelerate the solvent replacement process.

(S5) The aramid fiber suspension was filtered with a 400-mesh secondary filter to obtain an aramid fiber gel and a dimethyl sulfoxide/water mixture solution.

(S6) The dimethyl sulfoxide/water mixture solution was distilled at 102° C. to recycle the dimethyl sulfoxide. The aramid fiber gel was dried to recycle the aramid fiber.

In Example 4, more than 95% of the aramid fiber, 99% of the mica flake and 90.7% of the organic system were recycled.

Example 5

Provided was a method for recycling waste aramid-mica composite paper, which included the following steps.

(S1) Waste aramid-mica composite paper was pre-processed by air drying for 4 h, and cutting to obtain a dehydrated aramid-mica composite paper scrap with a size of 2 cm$^2$.

(S2) 1 g of potassium hydroxide was dissolved in 1 mL of water, and then added with 300 ml of dimethyl sulfoxide solution followed by stirring for 30 min to obtain a water/potassium hydroxide/dimethyl sulfoxide mixture solution. Then, 20 g of the dehydrated aramid-mica composite paper scrap were added into the water/potassium hydroxide/dimethyl sulfoxide mixture solution to obtain a mixture system A.

(S3) The mixture system A was filtered with a 100-mesh primary filter to obtain a mica flake and an aramid fiber solution.

(S4) Water was added to the aramid fiber solution for solvent replacement to obtain an aramid fiber suspension, where the volume ratio of the water to the aramid fiber solution was 2:1.

Mechanical stirring was performed at 400 r/min for 20 min to accelerate the solvent replacement process.

(S5) The aramid fiber suspension was filtered by a 400-mesh secondary filter to obtain the aramid fiber gel and dimethyl sulfoxide/water mixture system solution.

(S6) The dimethyl sulfoxide/water mixture solution was distilled at 103° C. to recycle the dimethyl sulfoxide. The aramid fiber gel was dried to recycle the aramid fiber.

In Example 5, more than 93 wt % of the aramid fiber, 98 wt % of the mica flake, and 91.2 wt % of the organic system were recovered.

Refer to Table 1, Table 1 showed the recycling results of drugs. The method provided herein was environmentally friendly, stable and highly maneuverable, and has good social and economic benefits and environmental protection values.

TABLE 1

Recycling results of drugs

| Examples | Weight of the waste aramid-mica composite paper (g) | Weight of the recycled mica flake (g) | Weight of the recycled aramid fiber (g) | Weight percentage of the recycled dimethyl sulfoxide (%) |
|---|---|---|---|---|
| 1 | 5 | 1.41 | 3.47 | 90.5 |
| 2 | 5 | 1.40 | 3.44 | 91.7 |
| 3 | 5 | 1.46 | 3.83 | 92.3 |
| 4 | 10 | 2.73 | 7.25 | 90.7 |
| 5 | 20 | 5.41 | 14.38 | 91.2 |

What is claimed is:

1. A method for recycling waste aramid-mica composite paper, comprising:
   (S1) pre-processing the waste aramid-mica composite paper to obtain a dehydrated aramid-mica composite paper scrap;
   (S2) dissolving the dehydrated aramid-mica composite paper in a mixture solution to obtain a mixture system A, wherein the mixture solution comprises a dispersing agent, an alkali, and an organic solvent;
   (S3) filtering the mixture system A with a primary filter to obtain a mica flake and an aramid fiber solution;
   (S4) adding a replacement solvent to the aramid fiber solution for solvent replacement and phase separation to obtain an aramid fiber suspension;
   (S5) filtering the aramid fiber suspension with a secondary filter to obtain an aramid fiber gel and a mixture system B composed of the organic solvent and the dispersing agent; and
   (S6) subjecting the mixture system B to distillation at a preset temperature to recycle the organic solvent; and drying the aramid fiber gel to collect aramid fiber.

2. The method of claim 1, wherein in step (S1), the waste aramid-mica composite paper is aramid-mica paper or a paper-based material with poly(m-phenylene isophthalamide) as polymer matrix.

3. The method of claim 1, wherein a size of the dehydrated aramid-mica composite paper scrap is 2-5 cm$^2$.

4. The method of claim 1, wherein in step (S2), the mixture solution is prepared through steps of:
   dissolving the alkali in the dispersing agent to form a mixture followed by addition of the organic solvent and stirring to obtain the mixture solution;
   wherein a ratio of the dispersing agent to the alkali to the organic solvent is 1 mL:(1-2) g:(300-600) mL.

5. The method of claim 4, wherein the dispersing agent is water, ethanol, methanol, or a combination thereof; the alkali is solid potassium hydroxide, solid sodium hydroxide, or a combination thereof; and the organic solvent is dimethyl sulfoxide, dimethyl formamide, or a combination thereof.

6. The method of claim 1, wherein the primary filter is a 100-200 mesh filter; and the secondary filter mesh is a 400-1000 mesh filter.

7. The method of claim 1, wherein in step (S4), a volume ratio of the replacement solvent to the aramid fiber solution is (2-3):1.

8. The method of claim 1, wherein the replacement solvent is water or ethanol.

9. The method of claim 8, wherein in step (S6), when the replacement solvent is water, the preset temperature is 100-105° C.; and when the replacement solvent is ethanol, the preset temperature is 75-78° C.

10. The method of claim 1, wherein in step (S6), the drying of the aramid fiber gel is performed at 60-100° C. for 4-24 hours.

* * * * *